United States Patent
Thoemmes et al.

(10) Patent No.: US 9,956,708 B2
(45) Date of Patent: May 1, 2018

(54) INJECTION MOLD PLATE AND INJECTION MOLD HAVING SUCH AN INJECTION MOLD PLATE

(71) Applicant: MHT Mold & Hotrunner Technology AG, Hochheim (DE)

(72) Inventors: Helmut Thoemmes, Kastel-Staadt (DE); Christian Wagner, Mainz (DE)

(73) Assignee: MHT MOLD & HOTRUNNER TECHNOLOGY AG, Hochheim (DE)

( * ) Notice: Subject to any disclaimer, the term of this patent is extended or adjusted under 35 U.S.C. 154(b) by 571 days.

(21) Appl. No.: 14/384,499

(22) PCT Filed: Mar. 13, 2013

(86) PCT No.: PCT/EP2013/055163
§ 371 (c)(1),
(2) Date: Sep. 11, 2014

(87) PCT Pub. No.: WO2013/135779
PCT Pub. Date: Sep. 19, 2013

(65) Prior Publication Data
US 2015/0044324 A1 Feb. 12, 2015

(30) Foreign Application Priority Data

Mar. 16, 2012 (DE) .................. 10 2012 102 266

(51) Int. Cl.
*B29C 45/12* (2006.01)
*B29B 11/08* (2006.01)
(Continued)

(52) U.S. Cl.
CPC .......... *B29C 45/4225* (2013.01); *B29B 11/08* (2013.01); *B29C 45/261* (2013.01);
(Continued)

(58) Field of Classification Search
CPC .............. B29C 45/4225; B29C 45/261; B29C 2045/7214; B29C 2045/7221; B29C 49/64; B29B 11/08
See application file for complete search history.

(56) References Cited

U.S. PATENT DOCUMENTS

| 4,219,323 A | 8/1980 | Bright et al. |
| 5,855,932 A | 1/1999 | Bright et al. |

(Continued)

FOREIGN PATENT DOCUMENTS

| DE | 69316637 T2 | 7/1998 |
| DE | 10305669 A1 | 8/2004 |

(Continued)

OTHER PUBLICATIONS

Kob, Sabine: "Hoehere Leistung, geringer Aufwand", May 2011, pp. 12-14, XP002716973, http://fzarchiv.sachon.de/Zeitschriftenarchiv/Getraenke-Fachzeitschriften/Getraenkeindustrie/2011/05_11/GI_5-11_12-14_Hoehere_Leistung_geringer_Aufwand.pdf#all_thumb.

(Continued)

*Primary Examiner* — Alison L Hindenlang
*Assistant Examiner* — Emmanuel S Luk
(74) *Attorney, Agent, or Firm* — Michael L. Dunn (57) ABSTRACT

The present invention relates to an injection mold plate for use in an injection mold for producing molded articles, comprising a plurality of handling elements arranged in columns and rows, wherein the distance r between adjacent handling elements within the rows is greater than the distance s between adjacent handling elements within the columns. According to the invention, in order to provide an injection mold plate of the type mentioned above for which the distance between adjacent handling elements can be reduced without impairing the generally required heating (Continued)

channel, it is proposed that a row of handling elements is formed by two groups of handling elements, wherein the following applies to the distance z between the group: $z=r(1+a/n)$, wherein r is the distance of the handling elements within a group and n, a $\in$ IN with n>1.

15 Claims, 4 Drawing Sheets

(51) Int. Cl.
| | |
|---|---|
| B29C 45/42 | (2006.01) |
| B29C 45/26 | (2006.01) |
| B29C 49/64 | (2006.01) |
| B29K 105/00 | (2006.01) |
| B29C 45/72 | (2006.01) |

(52) U.S. Cl.
CPC ...... *B29C 49/64* (2013.01); *B29C 2045/7214* (2013.01); *B29C 2045/7221* (2013.01); *B29K 2105/253* (2013.01); *B29K 2105/258* (2013.01)

(56) References Cited

U.S. PATENT DOCUMENTS

| | | | |
|---|---|---|---|
| 6,315,543 B1* | 11/2001 | Lausenhammer | B29C 45/42 |
| | | | 264/334 |
| 2004/0185136 A1 | 9/2004 | Domodossola et al. | |
| 2006/0121153 A1* | 6/2006 | Neter | B29C 45/42 |
| | | | 425/556 |
| 2008/0093770 A1 | 4/2008 | Zoppas et al. | |
| 2008/0296801 A1 | 12/2008 | Zoppas et al. | |

FOREIGN PATENT DOCUMENTS

| | | |
|---|---|---|
| DE | 102010018121 A1 | 10/2011 |
| WO | 0138067 A1 | 5/2001 |
| WO | 2006060893 A1 | 6/2006 |
| WO | 2010066308 A1 | 6/2010 |

OTHER PUBLICATIONS

Anonym: "Maschinenleisung deutlich steigern", Jul. 18, 2011, pp. 1-1, XP002716974, http://www.verpackungsrundschau.de/news/show/branchen-news/43986.

Anonym: "mht News", Nov. 16, 2010, pp. 1-2, XP002716975, http://www.sams-ag.com/images/mht-pdf/Newsletter%20102010.pdf.

\* cited by examiner

INJECTION MOLD PLATE AND INJECTION MOLD HAVING SUCH AN INJECTION MOLD PLATE

CROSS REFERENCE TO RELATED APPLICATIONS

This application is a nationalization of International Application PCT/EP2013/055163 filed Mar. 13, 2013 and claims priority from German Application DE 102012102266.6 tiled Mar. 16, 2012 both of which are incorporated by reference.

BACKGROUND OF THE INVENTION

The present invention concerns an injection molding tool plate for use in an injection molding tool for producing molded articles comprising a plurality of handling elements arranged in columns and rows, wherein the spacing r between adjacent handling elements within the row is greater than the spacing s between adjacent handling elements within the columns, Injection molding is one of the most important processes for the production of molded articles or shaped parts. In that case the molding material which is generally originally present in the form of powder or granular material is heated, plasticized and pressed under high pressure into a corresponding molding tool. The molding material sets in the molding tool and is then removed from the opened tool. By way of example commercially usual PET bottles are produced by stretch blow molding of a hollow body preform or hollow body pre-molding. In that procedure the preform is produced by injection molding in a first step. The stretch blow molding operation which follows the injection molding process can be effected either immediately after production of the preform or at a later time, A high level of complication and expenditure is needed in the production of the corresponding injection molding molds as the injection molding mold on the one hand must be designed for very high pressures and on the other hand must have suitably heated and/or cooled passages.

Even if the present invention could be used in principle in injection molding tools of any kind it is described hereinafter by reference to an injection molding tool for the production of PET preforms. Such injection molding tools have a large number, for example 96, of cavities into which suitably designed tool cores are introduced. When the tool is closed, that is to say when the core is inserted into the corresponding cavity, a space, the so-called mold space, is formed between the core on the one hand and the cavity on the other hand, and then the plasticized plastic material, for example PET, is injected under high pressure into that space. As soon as the PET preform has sufficiently cooled the mold can be opened and the preform removed. To reduce the cycle times, that is to say the time from one injection process to the next, it is already usual for the preform to be removed from the mold at a very early time, at which the preform is already firm at its outside surfaces, but the inside region thereof is still fluid. The preform is generally transferred in that condition into a so-called removal plate having a set of receiving cavities. In that case the receiving cavity set includes as many receiving cavities as the tool has cores or cavities so that the hardened preform can be transferred from each core into a receiving cavity. Thus for example in the case of the so-called vertical tools, that is to say those injection molding tools which open by a vertical movement of the one tool portion relative to the other, the tool mold is already to be opened after for example 10 seconds, a removal plate with suitable receiving cavities is to be introduced between the tool portions into the mold, the individual preforms are to be allowed to drop into the receiving cavities under the force of gravity, the removal plate with the preforms is to be removed from the tool, the mold is to be dosed again, and the next injection molding process is to be begun. During the next injection molding process the previous preforms remain in the receiving cavities which are usually cooled.

Embodiments are also known in which the individual preforms are removed from the mold by means of a gripper unit and are transferred into the removal plate arranged outside the tool mold.

As the preform must remain in the receiving cavity of the state of the art for cooling purposes for a comparatively long time so that in general the next preform can already be removed from the injection molding tool before the preform has cooled down in the receiving cavity to such an extent that it can be removed without the risk of damage it is already usual to employ removal plates having a plurality of sets of receiving cavities, wherein each set has as many receiving cavities as the injection molding tool provides preforms for each injection cycle. The individual receiving cavity sets are then successively equipped with preforms so that the individual preform can remain in the receiving cavity longer than an injection molding cycle.

In the production of preforms the injection molding tools have two tool halves which can be reciprocated between an open and a closed position. The one tool half has the so-called cavity plate which has a large number of cavities arranged in columns and rows, wherein the spacing r between adjacent cavities within the rows is greater than the spacing s between adjacent cavities within the columns. The other tool half has a core plate which has corresponding cores which are arranged within the cavities in the closed condition of the tool mold. Therefore the cores are also arranged in a large number of columns and rows, wherein the spacing r between adjacent cores within the rows is greater than the spacing s between adjacent cores within the columns. Both the cores and also the cavities are handling elements in the sense used in the present invention. Handling elements are all elements which come into contact with or process the molded articles during manufacture or removal or subsequent cooling.

In general the feed of the plasticized molten PET material is effected by way of openings in the bottom of the cavities. To be able to feed the plasticized molten material uniformly to all cavities the cavity plate has a corresponding hot runner network arranged in the interior of the cavity plate. As the sprue, that is to say the point at which the plasticized molten material is fed to the cavity plate, is generally arranged in the center of the plate the hot runner network extends from the sprue to each cavity, wherein the runners become progressively narrower, the further they are away from the sprue. In the proximity of the sprue however a portion of the hot runner will be of a relatively large cross-section so that adjacent cavities cannot be arranged too closely together in mutually juxtaposed relationship.

For that reason in the described PET tool a spacing of about 140 mm is frequently maintained between the center point of a cavity and the center point of the cavity immediately adjacent in the direction of the row.

In principle uses are also conceivable, in which it is not the cross-section of the hot runner but possibly the cross-section of cooling passages in given regions of the cavity plate or the core plate, that prevents the handling elements from being arranged too close together, In general the spacing s between adjacent cavities within the columns can be selected to be smaller.

By virtue of the relatively large spacing r between adjacent cavities and cores within the rows the individual receiving cavity sets can be arranged in interleaved relationship so that for example a respective receiving cavity of a second set is arranged between two receiving cavities of a first set respectively. In other words, for example in the case of two receiving cavity sets in the row direction, each second receiving cavity belongs to the first receiving cavity set while the other receiving cavities belong to the second receiving cavity set.

As soon therefore as the injection molding tool opens the removal plate can be moved into the opened tool and receive the preforms. Then, by virtue of the special arrangement of the receiving cavity sets, in the case of two receiving cavity sets each second receiving cavity is occupied by a preform while the other receiving cavities of the removal plate are empty. The removal plate is now moved out of the tool, the tool is closed and the next set of preforms produced. As soon as the mold is opened again the removal plate is moved again between the opened tool halves but this time into a displaced position so that now the preforms of the next set can be transferred to the free receiving cavities of the other receiving cavity set.

As soon as all receiving cavities are occupied and the removal plate is moved out of the tool again the preforms kept longest in the removal plate have to be removed. For that purpose a post-treatment plate equipped with cooling pins and removal pins is oriented with the removal plate in such a way that the cooling pins and the removal pins respectively engage into the preforms held in the removal plate. The cooling pins serve to feed coolant, for example air, while the removal pins can be actuated in such a way, for example by applying a reduced pressure, that they can take the corresponding preform out of the removal plate. In order to be able to remove all preforms from the different receiving cavity sets the post-treatment plate can be oriented in various mutually displaced positions with the removal plate so that, in each of the different positions, the removal pins align with another receiving cavity set and the preforms disposed therein can be removed thereby.

In principle it is desirable for the cavities and cores to be arranged as closely together as possible to reduce material and weight of the injection molding tools.

In general however at least one hot runner for feeding the plasticized molten material extends substantially in the column direction within the cavity plate, and that has the result that the cavities cannot be arranged as close to each other as may he desired in the region of that hot runner. In the state of the art therefore that hot runner establishes the spacing of for example 140 mm between adjacent cavities. The result of this is that the cores must also be at the corresponding spacing, which in turn has the result that the receiving cavities of a receiving cavity set must also he at a spacing of 140 mm from center point to center point. To ensure removal and post-treatment or cooling of the preforms in the removal plate the removal pins and the cooling pins of the post-treatment plate must then also involve the same spacing dimension.

BRIEF SUMMARY OF THE INVENTION

In accordance with the invention, it has now been recognized that a reduction in the usual spacing dimension of 140 mm would therefore save on material and weight not only in regard to the cavity plate but also in regard to the core plate and the removal plate and post-treatment plate. Alternatively it is naturally also possible, with a given plate size which depends on the injection molding machine used, with a smaller spacing, to arrange a larger number of handling elements on the plates so that a larger number of preforms can be produced in each injection molding cycle.

Therefore the object of the invention is to provide an injection molding tool plate of the kind set forth in the opening part of this specification, in which the spacing between adjacent handling elements can be reduced without the hot runner which is generally required being adversely affected.

According to the invention that object is attained in that a row of handling elements is formed by two groups of handling elements, wherein the following applies for the spacing z between the groups of handling elements:

$$z = r\left(1 + \frac{a}{n}\right),$$

wherein r is the spacing of the handling elements within a group and n, a ∈ IN with n>1.

More particularly, the invention includes an injection molding tool plate for use in an injection molding tool for producing molded articles comprising a plurality of handling elements arranged in columns and rows, wherein the spacing r between adjacent handling elements within the rows is greater than the spacing s between adjacent handling elements within the columns, characterised in that a row of handling elements is formed by two groups of handling elements, wherein the following applies for the spacing z between the groups of handling elements:

$$z = r\left(1 + \frac{a}{n}\right),$$

wherein r is the spacing at the handling elements within a group and n, a ∈ IN with n>1.

DETAILED DESCRIPTION OF THE INVENTION

Insofar as reference is made to a spacing in this application that always means the spacing from center point to center point unless expressly stated otherwise. IN of are the natural numbers (integers) (1, 2, 3 . . . ). The division according to the invention of the handling elements into two groups means that they can be arranged on both sides of the hot runner so that within the groups the spacing between the handling elements can be reduced while the spacing z between the handling element of the first group which is arranged closest to the second group and the handling element of the second group arranged closest to the first group of handling elements is selected to be greater.

It will be noted however that the spacing cannot differ just as desired from the spacing r as, by virtue of the provision of a plurality of sets of receiving cavities in the removal plate and the mutually displaced transfer positions linked thereto between the removal plate on the one hand and the cavity plate or core plate on the other hand, mismatches can occur between the spacing z between the groups of handling elements.

With the choice of spacing according to the invention however this guarantees that the removal plate and the cavity plate can be positioned in matching relationship with each other at any time.

In a preferred embodiment a is selected to be <n. By virtue of that choice for example receiving cavities of the removal plate can be provided in a first position for receiving preforms from the first group of cavities while in another position they are provided for receiving preforms from the other group of cavities. In general n is desirably to be selected as n<5 and preferably n=3.

A particularly preferred embodiment further provides that a=1.

As already stated the injection molding tool plate can be in the form of a cavity or core plate so that the handling elements are then cavities or cores whose inside or outside contour respectively corresponds to the outside or inside contour of a molded article to be produced.

In principle however the injection molding tool plate can be a removal plate for the removal of molded articles from an injection molding mold having a core plate or cavity plate of suitable configuration, wherein then the handling elements are elements for receiving molded articles from the injection molding mold, preferably receiving sleeves, wherein the removal plate has a plurality of handling element sets, wherein each handling element set has a plurality of handling elements arranged in columns and rows, wherein the spacing r between adjacent handling elements of the handling element set within the rows is greater than the spacing s between adjacent handling elements of said handling element set within the columns, wherein a row of handling elements of the handling element set is formed by two groups of handling elements of the handling element set, wherein the following applies for the spacing z between the groups of handling elements of the handling element set:

$$z = r\left(1 + \frac{a}{n}\right),$$

wherein r is the spacing of the handling elements of the handling element set within a group and n, a $\in$ IN with n>1 and a<n.

If therefore the individual cores and cavities of the injection molding tool are arranged, as described in the last paragraph of the Brief Summary of the Invention above, then the corresponding receiving elements of the removal plate must also be arranged at the same spacing. As the removal plate must generally hold a plurality of sets of preforms at the same time, which are successively transferred into the corresponding receiving elements, the removal plate has various sets of handling elements or receiving elements. Preferably therefore in each set of handling elements a row of handling elements should be formed by two groups of handling elements, wherein the above-indicated condition applies to the spacing z.

Advantageously the number of handling element sets is n. In other words, n is selected for determining the spacing between the groups of cavities and cores of the injection molding tool in accordance with the number of handling element sets provided for the removal plate. If for example the removal plate has three handling element sets then the spacing z is best 4/3×r.

In a particularly preferred embodiment associated with each handling element of a first handling element set is a handling element of a second handling element set, wherein the handling elements are intended to successively receive molded articles from the injection molding mold and more specifically from the same cavity or from the same core. In that case preferably the spacing h between the associated handling elements is h=r/n.

In a further preferred embodiment the injection molding tool plate is a post-treatment plate, in which the handling elements are removal elements, preferably removal pins, for removal of the molded articles from a removal plate.

The spacing selected according to the invention between the two groups of handling elements for the core plate and the cavity plate therefore have to be appropriately selected not only for the removal plate but also for the post-treatment plate cooperating with the removal plate. In the case of three handling element sets of the removal plate the post-treatment plate can be positioned in three different positions relative to the removal plate, in which case the removal elements are respectively oriented with another handling element set of the removal plate and can remove the preforms arranged in that handling element set.

In a further preferred embodiment the post-treatment plate has at least one post-treatment set having a plurality of post-treatment elements arranged columns and rows, preferably cooling pins, wherein the spacing r between adjacent post-treatment elements of the post-treatment set within the rows is greater than the spacing s between adjacent post-treatment elements of the post-treatment set within the columns, wherein a row of post-treatment elements of the post-treatment set is formed by two groups of post-treatment elements, wherein the following applies for the spacing z between the groups of post-treatment elements:

$$z = r\left(1 + \frac{a}{n}\right),$$

wherein r is the spacing of the post-treatment elements within a group and n, a $\in$ IN with n>1 and a<n.

In other words the post-treatment plate has not only removal pins but also corresponding cooling pins which are inserted into the preforms and cool the preforms from the inside. The rule in respect of the arrangement must then also apply to the cooling pins.

In the best-case scenario the number of post-treatment sets is (n−1). In the case of three sets of receiving cavities therefore there are in the best case two post-treatment sets so that, as soon as the post-treatment plate is oriented with respect to the removal plate, a receiving cavity set can be emptied by means of the removal elements while the other two receiving cavity sets or the preforms disposed therein can be cooled with the cooling pins of the two post-treatment sets.

There were described a cavity plate, a core plate, a removal plate and a post-treatment plate which respectively have handling elements which are arranged in groups which are disposed at a suitable spacing relative to each other, as stated hereinbefore. Therefore those individual elements can be used to make up an injection molding tool for the production of preforms. The tool then has:

i) a cavity plate according to the invention,
ii) a core plate according to the present invention, wherein the cavity plate and the core plate are reciprocable relative to each other between a closed position and an opened position, wherein in the closed position the handling elements of the core plate, that are in the form of cores, are inserted into the handling elements of the cavity plate, that are in the form of cavities, so that there are formed between cores on the one hand and cavities on the other hand mold spaces whose inside contour corresponds to the outside contour of the molded articles to be produced,
iii) a removal plate according to the invention, wherein the removal plate can be reciprocated between an external position in which the removal plate is not arranged between the cavity plate and the core plate and at least two removal positions in which the removal plate is arranged between the cavity plate and the core plate, wherein in each removal position a respective handling element set is arranged in oriented relationship with the core or cavity plate so that the molded articles can be transferred from the core or cavity plate to the handling elements of the orientedly arranged handling element set, and
iv) a post-treatment plate according to the invention.

Further advantages, features and possible uses of the present invention will be clearly apparent from the description hereinafter of a preferred embodiment and the related Figures.

Figure 1:
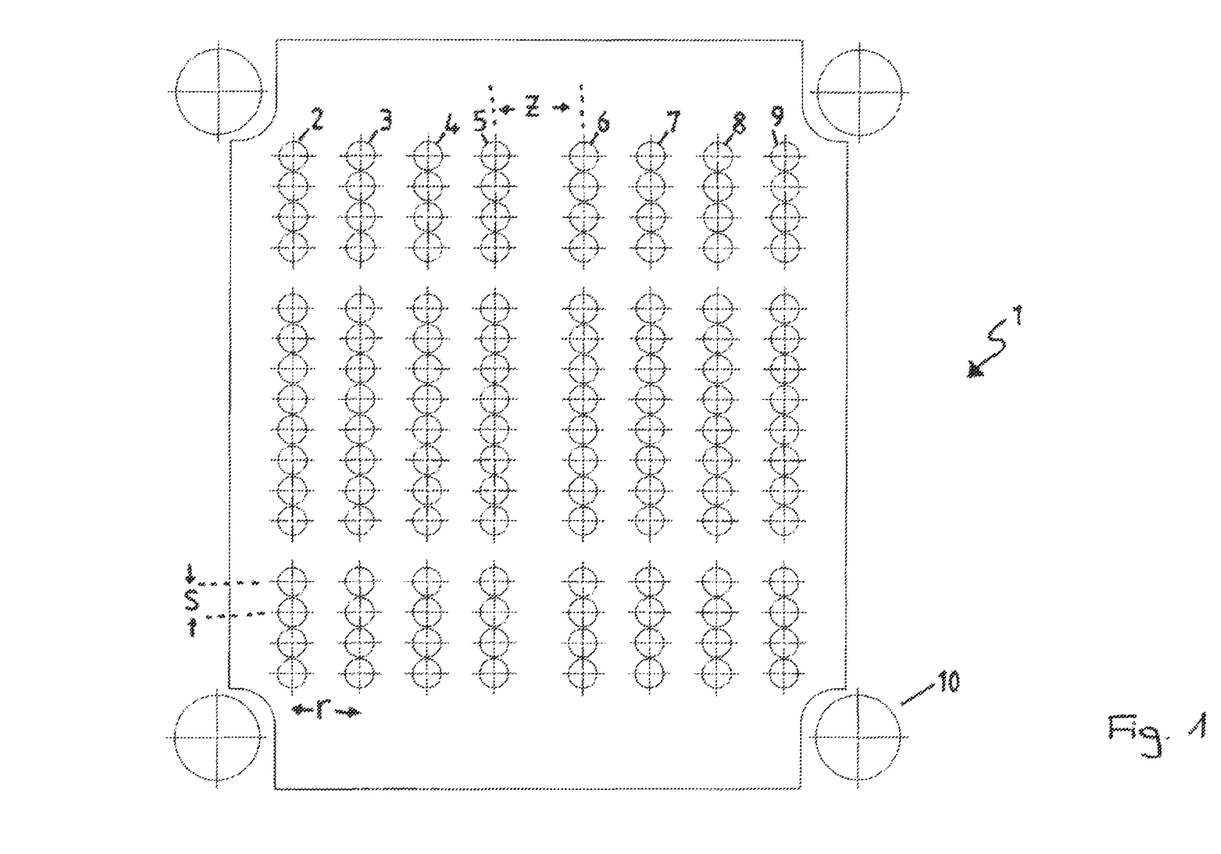
FIG. 1 shows a diagrammatic view of a core or cavity plate.

FIG. 1 shows a diagrammatic plan view of a core plate according to a preferred embodiment. The core plate 1 has a row of handling elements 2-9 which are in the form of cores and which are arranged in rows and columns.

The core plate cooperates with a corresponding cavity plate whose cavities are arranged at the same spacing relative to each other as the cores of the core plate relative to each other.

Therefore the arrangement of the cores on the core plate is described hereinafter with reference to FIG. 1. The arrangement of the cavities in the cavity plate is however the same.

Both the core and also the cavity plate are parts of an injection molding tool, wherein either the cavity plate or the core plate can be moved towards or away from the other plate along the guide columns 10. In the closed position the cores of the core plate come to tie within the cavities of the cavity plate to form mold spaces whose internal contour corresponds to the external contour of the preforms to be produced.

The cores of the core plate 1 which is shown in FIG. 1 are at the spacing s relative to each other in the column direction. In the row direction the cores are at the spacing r which is greater than the spacing s. In the column direction there are two intermediate jumps, that is to say two rows in which no cores are arranged. Those intermediate jumps are required to receive suitable slider elements for opening neck jaws. These however have nothing to do with the present invention. According to the invention the cores of a row are divided into two groups. The first group comprises the cores 2, 3, 4 and 5 while the other group comprises the cores 6, 7, 8 and 9. The spacing between the cores of a group is r while the spacing between the cores, which are closest to each other, of different groups is z. The following applies for z:

$$z = r\left(1 + \frac{a}{n}\right),$$

wherein r is the spacing of the handling elements within a group and n, a ∈ IN with n>1. In the examples shown in the Figures a=1 and n=3 so that z=4/3r.

In contrast to the known state of the art in which the spacings in the row direction were all of equal size it is now provided according to the invention that the spacings between the groups are smaller than the spacing between adjacent groups. The reason for this is that the plasticized molten material required for production of the preforms has to be supplied within the plate. The runner required for that purpose does not allow the cores 5 and 6 to be arranged closer together, However within the groups it is possible to dispense with runners of large cross-section so that the spacings within a group can be reduced, which saves on material or opens up the possibility, in the case of a core plate of equal size, to dispose more cores, whereby the injection molding tool has a higher output capacity.

Figure 2:
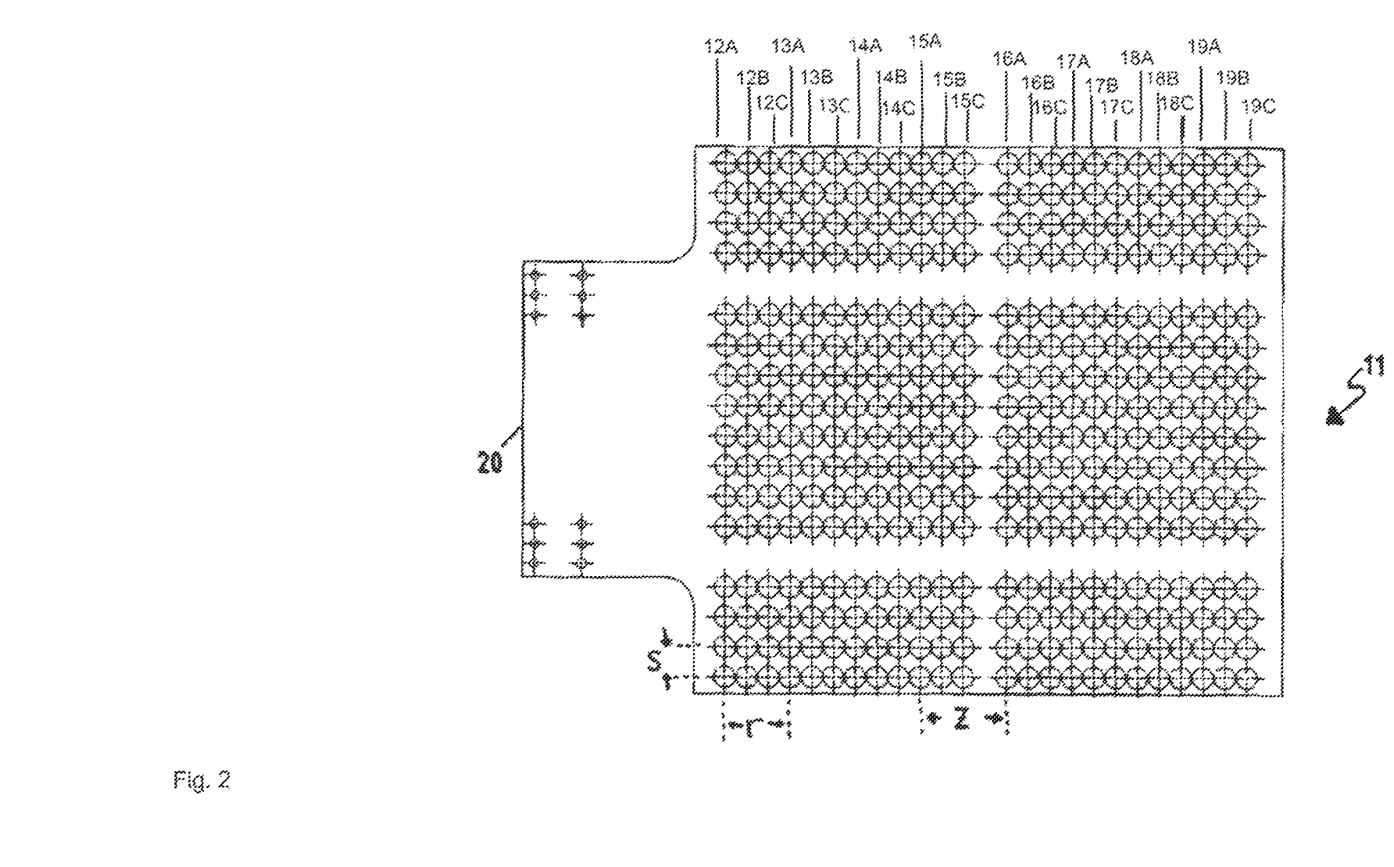
FIG. 2 shows a diagrammatic plan view of a removal plate.

FIG. 2 is a diagrammatic plan view of a removal plate 11. The removal plate 11 has a fixing portion 20 with which the plate can be fixed in a robot arm with which the removal plate can be moved into the opened mold to receive the preforms from the mold. The removal plate 11 has columns 12A, 13A, 14A, 15A, 6A, 17A, 18A and 19A with receiving cavities also arranged in rows and columns. In the column direction the receiving cavities are also at the spacing s while in the row direction they are at the spacing r, as shown in FIG. 2. In this case also the individual columns are divided into groups in the row direction so that this gives a group with columns of receiving cavities 12A, 13A and 14A and 15A as well as a further group with the columns of receiving cavities 16A, 17A, 18A and 19A.

To simplify this description hereinafter the individual columns 12A, 13A, 14A, 15A, 16A, 17A, 18A and it 19A of receiving cavities are also only referred as receiving cavities 12A, 13A, 14A, 15A, 16A, 17A, 18A and 19A. Nonetheless each receiving cavity 12A, 13A, 14A, 15A, 16A, 17A, 18A and 19A comprises a plurality of receiving cavities arranged in the column direction.

The removal plate 11 can be guided into the opened tool so that the receiving cavity 12A can receive the preform from the core 2 (see FIG. 1) while the receiving cavity 13A can receive the preform from the core 3, and so forth.

The removal plate has a plurality of sets of receiving cavities. The first set comprises the receiving cavities 12A, 13A, 14A, 15A, 16A, 17A, 18A, 19A while the second set comprises the receiving cavities 12B, 13B, 14B, 15B, 16B, 17B, 18B and 19B and finally the third set comprises the receiving cavities 12C, 13C, 14C, 15C, 16C, 17C, 18C and 19C, The removal plate 11 can be positioned in three different positions between the opened tool halves, that is to say between the core plate and the cavity plate, wherein, in one position, the core 2 is oriented with the receiving cavity 12A while in the second position it is oriented with the receiving cavity 12B and in the third position with the receiving cavity 12C. In the same fashion for example the core 6 is oriented in the first position with the receiving cavity 16A, in the second position with the receiving cavity 16B and in the third position with the receiving cavity 16C.

In the respective position the preforms can be transferred from the cores into the receiving cavities. Upon removal of the preforms of the next injection molding cycle the removal plate is moved into another position so that the preforms can remain in the receiving cavity over a longer period of time. They have to be removed only when that set of receiving cavities is used to receive the next preforms.

Figure 3:
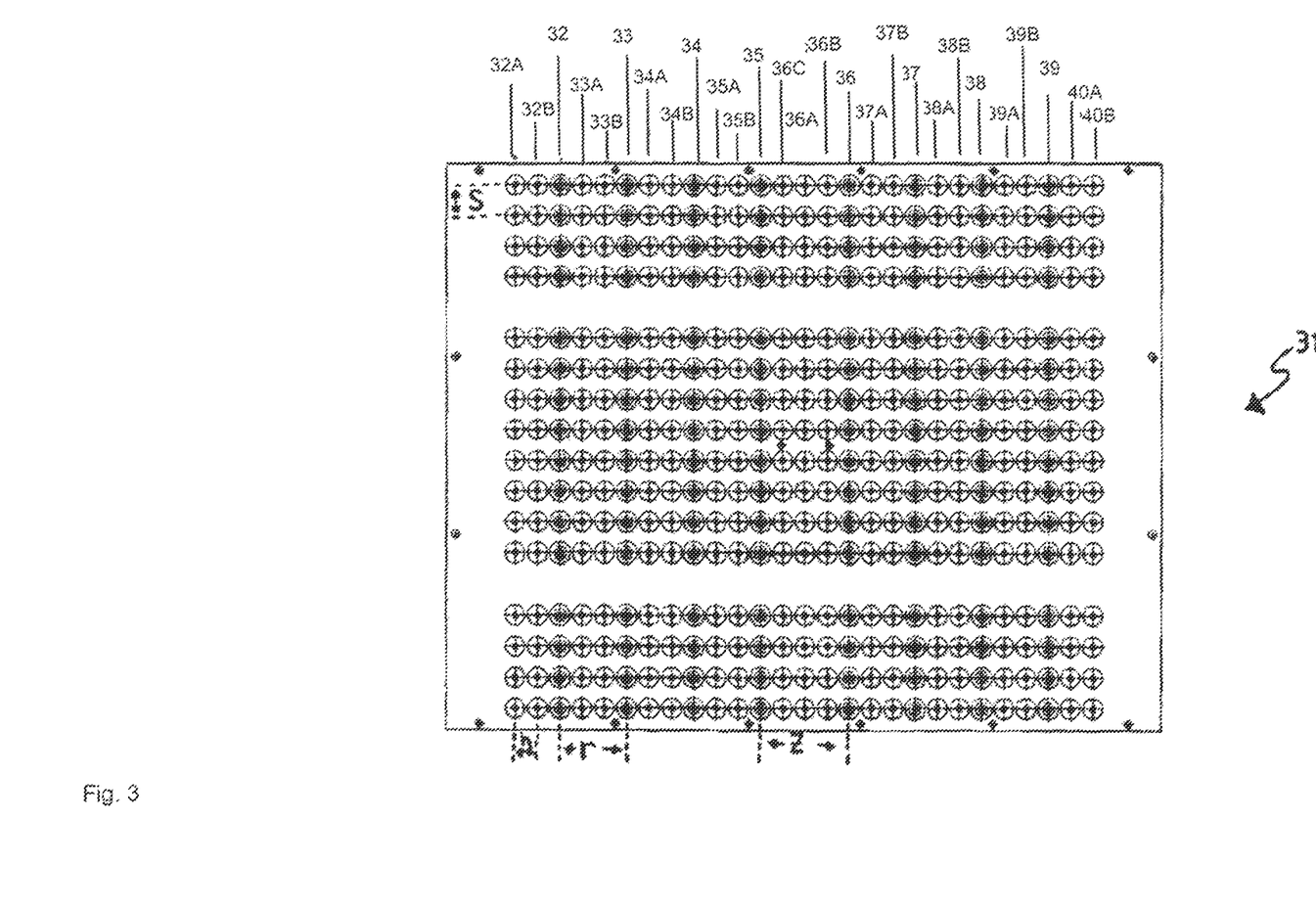
FIG. 3 shows a diagrammatic plan view of a post-treatment plate.

The post-treatment plate shown in FIG. 3 is used for that purpose. The post-treatment plate 31 has removal elements 32 through 39 which are here in the form of removal pins. Those removal elements are also at the spacing s in the column direction while they are at the spacing r in the row direction. In this case also the removal elements are divided into two groups 32 through 35 on the one hand and 36 through 39 on the other hand, wherein the spacing in the row direction between the elements of a group is z. For removal of the post-treated, that is to completely cooled, preforms from the removal plate the post-treatment plate can again be positioned in three different positions relative to the removal plate so that for example the removal pin 32 can successively approach the receiving cavities 12A, 12B and 12C.

In addition the post-treatment plate also has a plurality of, in the illustrated example two, groups of post-treatment elements which here are in the form of cooling pins. The cooling pins 32A through B, 33A through B, 34A through B, 35A through B, 36A through B, 37A through B, 38A through B, 39A through B and 40A through B are also arranged in columns and rows and are also at the spacing s in the column direction. In the row direction the individual post-treatment pins of a set are at the spacing r and also again form two groups spaced from each other at the spacing z. The spacing between two adjacent post-treatment pins of different sets is h. In the illustrated example h is r/3. The post-treatment plate has the additional cooling pin 36C, the function of which is described in greater detail hereinafter.

Figure 4:
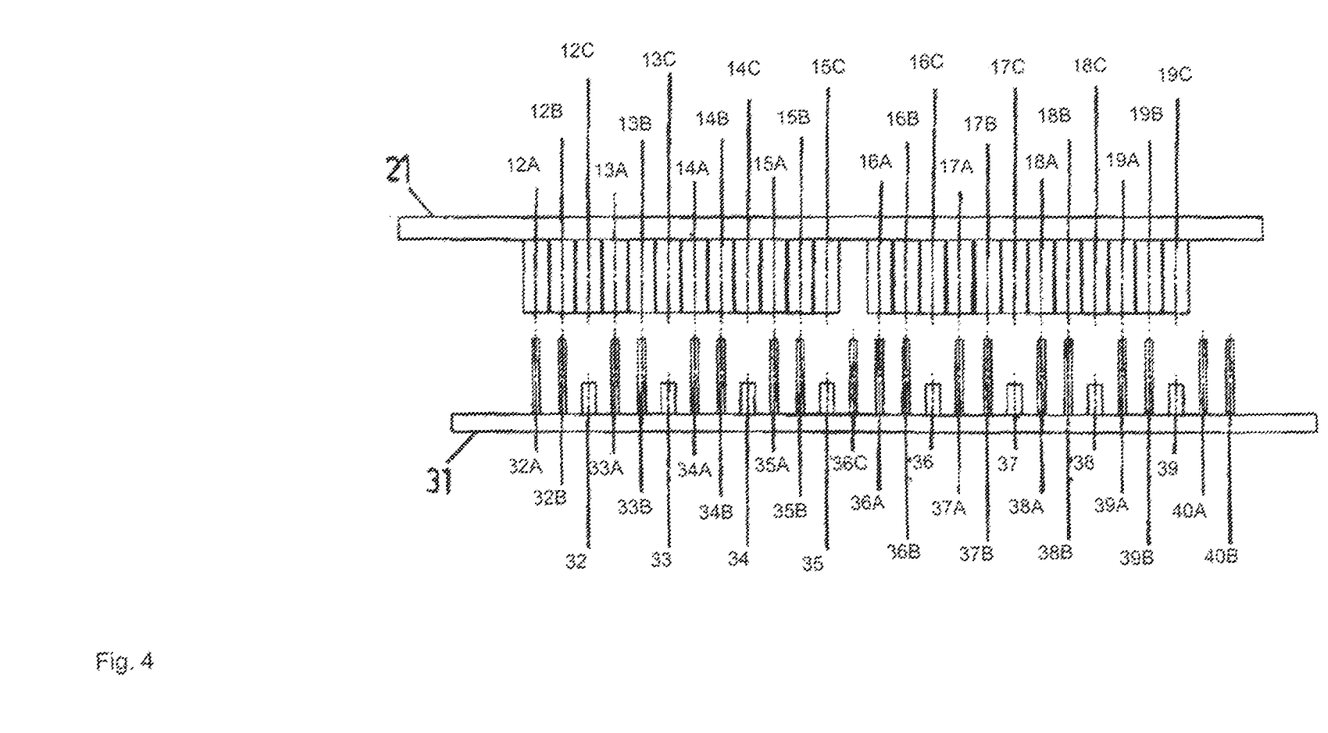
FIG. 4 shows a diagrammatic side view of a removal plate and a post-treatment plate.

For clarity purposes FIG. 4 shows a side view of the removal plate 21 and the post-treatment plate 31 oriented in relation thereto. In the illustrated position for example the removal pin 32 is capable of receiving a preform which is disposed in the receiving cavity 12C white the two associated cooling pins 32A and 32B cool the preforms in the receiving cavities 12A and 12B.

In the illustrated position the cooling pins 36C as well as 40A and 40B are not in operation.

As already stated the removal plate 21 can be positioned in three different positions relative to the post-treatment plate 31. In a second position which is not shown the cooling pin 32 is oriented in relation to the receiving cavity 12B so that then the cooling pin 32A comes out of operation as the cooling pin 32B then cooperates with the receiving cavity 12A. In that second position the cooling pin 36C is then also required for cooling the receiving cavity 15C and the cooling pin 40A for cooling the receiving cavity 19C.

Finally in the third position (also not shown) the removal pin 32 is arranged opposite the receiving cavity 12A so that the two cooling pins 32A and 32B are out of operation. In that position the cooling pin 36A now cooperates with the receiving cavity 15C.

It will now be clearly seen that, by virtue of the arrangement selected according to the invention of the cavities and cores and the resultant arrangement of the receiving cavities as well as the removal and cooling pins, in spite of different spacing between the groups, the cooling in 36C can cooperate both with the receiving cavity 15C of the first group in the described third position and also with the receiving cavity 16A of the second group in the first position shown in FIG. 4.

By virtue of the arrangement according to the invention it is possible to produce a markedly more compact injection molding tool without reducing the diameter of the hot runner. In principle it would also be conceivable for the handling elements to be divided into more than two groups, in which case then the claimed spacings would have to be observed for respective adjacent groups.

LIST OF REFERENCES 1 core plate
2-9 cores or handling elements
10 guide column
11 removal plate
20 fixing portion
12A-19A first set of receiving cavities
12B-19B second set of receiving cavities
12C-19C third set of receiving cavities
31 post-treatment plate
39 removal elements
32A, B-39A, B, 36C cooling pins

The invention claimed is:

1. An injection molding tool plate for use in an injection molding tool for producing molded articles comprising a plurality of handling elements arranged in columns and rows, wherein the spacing r between adjacent handling elements within the rows is greater than the spacing s between adjacent handling elements within the columns, wherein a row of handling elements is formed by two groups of handling elements, wherein the handling elements are cavities or cores whose inside or outside contour corresponds to the outside or inside contour of a molded article to be produced, such contour defining the outside or inside shape of the molded article, wherein the following applies for the spacing z between the groups of handling elements:

$$z = r\left(1 + \frac{a}{n}\right),$$

wherein r is the spacing of the handling elements within a group and n, a $\in$ IN with n>1.

2. An injection molding tool plate as set forth in claim 1 where a <n.

3. An injection molding tool plate as set forth in claim 2 where n <5.

4. An injection molding tool plate as set forth in claim 2 wherein n =3.

5. An injection molding tool plate as set forth in claim 1 wherein a =1.

6. An injection molding tool plate as set forth in claim 1 wherein the injection molding tool plate is a post-treatment plate and the handling elements are removal elements, for removal of the molded articles from a removal plate.

7. An injection molding tool plate as set forth in claim 6 comprising at least one post-treatment set having a plurality of post-treatment elements arranged columns and rows, wherein the spacing r between adjacent post-treatment elements of the post-treatment set within the rows is greater than the spacing s between adjacent post-treatment elements of the post-treatment set within the columns, wherein a row of post-treatment elements of the post-treatment set is formed by two groups of post-treatment elements, wherein the following applies for the spacing z between the groups of post-treatment elements:

$$z = r\left(1 + \frac{a}{n}\right),$$

wherein r is the spacing of the post-treatment elements within a group and n, a ∈ IN with n>1 and a<n.

8. An injection molding tool plate as set forth in claim 7 wherein the plurality of post-treatment elements are cooling pins.

9. An injection molding tool plate as set forth in claim 7 wherein the number of post-treatment sets is n−1.

10. An injection molding tool plate for use in an injection molding tool for producing molded articles comprising a plurality of handling elements arranged in columns and rows, wherein the spacing r between adjacent handling elements within the rows is greater than the spacing s between adjacent handling elements within the columns, wherein a row of handling elements is formed by two groups of handling elements, wherein the handling elements are cavities whose inside contour corresponds to the outside contour of a molded article to be produced, wherein the following applies for the spacing z between the groups of handling elements:

$$z = r\left(1 + \frac{a}{n}\right),$$

wherein r is the spacing of the handling elements within a group and n, a ∈ IN with n>1,
wherein the injection molding tool plate is a removal plate for the removal of molded articles from an injection molding mold and wherein the handling elements are elements for receiving molded articles from an injection molding mold wherein the removal plate has a plurality of handling element sets, wherein each handling element set has a plurality of handling elements arranged in columns and rows, wherein the spacing r between adjacent handling elements of a handling element set within the rows is greater than the spacing s between adjacent handling elements of said handling element set within the columns, wherein a row of handling elements of said handling element set is formed by two groups of handling elements of the handling element set, wherein the following applies for the spacing z between the groups of handling elements of the handling element set:

$$z = r\left(1 + \frac{a}{n}\right),$$

wherein r is the spacing of the handling elements of the handling element set within a group and n, a ∈ IN with n >1 and a <n and the elements for receiving molded articles comprise receiving sleeves.

11. An injection molding tool plate as set forth in claim 10 wherein the number of the handling element sets is n.

12. An injection molding tool plate as set forth in claim 11 wherein associated with each handling element of a first handling element set is a handling element of a second handling element set, wherein the handling elements are intended to successively receive molded articles from the injection molding mold.

13. An injection molding tool plate as set forth in claim 12 wherein the following applies for the spacing h between the associated handling elements: h =r /n.

14. An injection molding tool for the production of molded preforms comprising an injection molding tool comprising a plurality of handling elements arranged in columns and rows, wherein the spacing r between adjacent handling elements within the rows is greater than the spacing s between adjacent handling elements within the columns, wherein a row of handling elements is formed by two groups of handling elements, wherein the handling elements are cavities or cores whose inside or outside contour corresponds to the outside or inside contour of a molded article to be produced, wherein the following applies for the spacing z between the groups of handling elements:

$$z = r\left(1 + \frac{a}{n}\right),$$

wherein r is the spacing of the handling elements within a group and n, a ∈ IN with n >1.
which injection molding tool having a core plate and an injection molding tool plate wherein the handling elements are cavities or cores having inside or outside contour corresponding to an outside or inside contour of a molded article to be produced in the form of a cavity plate, wherein the cavity plate and the core plate are reciprocable relative to each other between a closed position and an opened position, wherein in the closed position the handling elements of the core plate, that are in the form of cores, are inserted into the handling elements of the cavity plate, that are in the form of cavities, whereby there are formed between cores on the one hand and cavities on the other hand mold spaces whose inside contour corresponds to the outside contour of the molded articles to be produced, and having an injection molding tool plate in the form a removal plate for the removal of molded articles from an injection molding mold having an injection molding tool plate, wherein the handling elements are cavities or cores having inside or outside contour corresponding to an outside or inside contour of a molded article to be produced, wherein the removal plate can be reciprocated between an external position in which the removal plate is not arranged between the cavity plate and the core plate and at least two removal positions in which the removal plate is arranged between the cavity plate and the core plate, wherein in each removal position a respective handling element set is arranged in oriented relationship with the core or cavity plate so that molded articles can be transferred from the core or cavity plate to the handling elements of the oriented handling element set, and an injection molding tool plate in the form of a post-treatment plate, wherein associated with each handling element of a first handling element set is a handling element of a second handling element set, wherein the handling elements are intended to successively receive molded articles from the injection molding mold.

15. The injection molding tool of claim 14, wherein spacing h between associated handling elements is h=r/n.

* * * * *